United States Patent
Miyazaki (10) Patent No.: US 8,622,107 B2
(45) Date of Patent: Jan. 7, 2014

(54) PNEUMATIC TIRE

(75) Inventor: Shinichi Miyazaki, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 550 days.

(21) Appl. No.: 12/598,160

(22) PCT Filed: May 27, 2008

(86) PCT No.: PCT/JP2008/059714
§ 371 (c)(1),
(2), (4) Date: Oct. 29, 2009

(87) PCT Pub. No.: WO2008/149725
PCT Pub. Date: Dec. 11, 2008

(65) Prior Publication Data
US 2010/0116391 A1   May 13, 2010

(30) Foreign Application Priority Data
Jun. 1, 2007 (JP) ................................. 2007-147190

(51) Int. Cl.
  B60C 9/02 (2006.01)
  B60C 17/00 (2006.01)
(52) U.S. Cl.
  USPC .................... 152/556; 152/209.14; 152/516
(58) Field of Classification Search
  USPC ............ 152/209.14, 516, 548, 552, 554, 555, 152/556
  See application file for complete search history.

(56) References Cited

U.S. PATENT DOCUMENTS

| | | | |
|---|---|---|---|
| 4,832,101 A | 5/1989 | Welter | |
| 4,832,102 A | 5/1989 | Domchick | |
| 6,089,295 A | 7/2000 | Komatsuki et al. | |
| 2003/0173013 A1* | 9/2003 | Idei | 152/531 |
| 2004/0123931 A1 | 7/2004 | Hanya | |

(Continued)

FOREIGN PATENT DOCUMENTS

| | | | | |
|---|---|---|---|---|
| JP | 55-46883 B2 * | 11/1980 | ............... | B60C 9/00 |
| JP | 1-240303 A | 9/1989 | | |

(Continued)

OTHER PUBLICATIONS

English language abstract of JP08-337101, 1996.*

(Continued)

*Primary Examiner* — Justin Fischer
*Assistant Examiner* — Philip N Schwartz
(74) *Attorney, Agent, or Firm* — Birch, Stewart, Kolasch & Birch, LLP (57) ABSTRACT

The heat resistance of carcass cords is enhanced, whereby the runflat durability is enhanced. A pneumatic tire has a carcass 6 and a tread-reinforcing cord layer 7 disposed radially outward of the carcass, the carcass 6 comprising a carcass ply 6A in which carcass cords 20 of aramid fiber are arranged at an angle of 45 to 90° with respect to the tire circumferential direction and are covered with a topping rubber, preferable carcass cords 20 have a two-bundle twisted structure that two bundles of first-twisted filaments are subjected to final twist, and preferable carcass cords 20 have a twist factor T of 0.5 to 0.7 represented by the equation (1):

$$T = N \times \sqrt{\{(0.125 \times D/2)/\rho\}} \times 10^{-3} \qquad (1)$$

in which N is the number of final twists per 10 cm, D is a total nominal dtex (fineness) of a cord, and ρ is a specific gravity of a cord material.

7 Claims, 8 Drawing Sheets

(56) References Cited

U.S. PATENT DOCUMENTS

| | | | |
|---|---|---|---|
| 2005/0109441 A1* | 5/2005 | Sugiyama et al. | 152/540 |
| 2007/0131329 A1 | 6/2007 | Miyazaki | |
| 2008/0066845 A1* | 3/2008 | Shiraishi et al. | 152/454 |

FOREIGN PATENT DOCUMENTS

| | | | |
|---|---|---|---|
| JP | 1-240304 A | 9/1989 | |
| JP | 08337101 A * | 12/1996 | B60C 3/00 |
| JP | 2713993 B2 | 2/1998 | |
| JP | 10-297211 A | 11/1998 | |
| JP | 2000-351307 A | 12/2000 | |
| JP | 2002-301914 A | 10/2002 | |
| JP | 2004-10005 A | 1/2004 | |
| JP | 2004-203129 A | 7/2004 | |
| JP | 2005-178520 A | 7/2005 | |
| JP | 2007-69890 A | 3/2007 | |
| JP | 2007-161071 A | 6/2007 | |
| WO | WO 2006/098110 * | 9/2006 | B60C 17/00 |

OTHER PUBLICATIONS

English language machine translation of JP2004-010005, 2004.*
English language machine translation of JP2007-69890, 2007.*
English language machine translation of JP2002-301914, 2002.*
Derwent Abstract for JP55-46883, 1980.*

* cited by examiner

PNEUMATIC TIRE

TECHNICAL FIELD

The present invention relates to a pneumatic tire which is suitable as, for example, a passenger car tire and a motorcycle tire, particularly as a runflat tire, and which has various tire performances improved with achieving weight reduction.

BACKGROUND ART

As a runflat tire capable of traveling for a relatively long distance in a deflated condition that the tire loses air pressure due to a puncture, there is known, for example, a tire of so-called side-reinforced type wherein a side-reinforcing rubber layer having a crescent-shaped cross section is disposed in each sidewall portion (see for example Patent Literature 1). In the runflat tire of this type, a plurality of carcass plies are used in order to enhance a load-supporting ability. Further, a rayon fiber cord which has a good heat resistance is used as a carcass cord in order to secure a durability in runflat mode, since the tire temperature in runflat mode is very high as compared with that during normal running in the inflated state.
Patent Literature 1: JP 2000-351307 A

DISCLOSURE OF THE INVENTION

Problem to be Solved by the Invention

Tires having the above-mentioned structure have a necessary minimum durability, but further improvement in runflat durability and steering stability is strongly desired from the viewpoints of recent demands for high running speed and long running distance in runflat mode.

Accordingly, it is an object of the present invention to provide a pneumatic tire which can enhance the steering stability and durability in runflat running, with achieving weight reduction, to achieve a high running speed and a long running distance in runflat running when used as a runflat tire, and which can achieve, in normal running, enhancement of the steering stability, a high running speed and a long running distance with achieving weight reduction when used as a tire for passenger car or motorcycle. The present invention is based on using, as a carcass cord, an aramid fiber cord which has a heat resistance superior to that of a rayon fiber cord and a high elasticity.

Means to Solve the Invention

In order to achieve the object mentioned above, the invention as claimed in claim 1 of the present application is directed to a pneumatic tire including a carcass extending from a tread portion to bead cores in bead portions through sidewall portions, and a tread-reinforcing cord layer disposed radially outward of the carcass and in the tread portion, and is characterized in that in the meridian cross section including the rotational axis of the tire in a normal inner pressure condition that the tire is mounted on a normal rim and inflated to a normal inner pressure, the outer surface of the tire has a curved profile composed of a plurality of circular arcs having different radii of curvature, the carcass comprises a carcass ply in which carcass cords are arranged at an angle of 45 to 90° with respect to a circumferential direction of the tire and are covered with a topping rubber, and an aramid fiber is used for the carcass cords.

The invention is characterized in that the carcass cords have a two-bundle twisted structure that two bundles of first-twisted filaments are subjected to final twist.

The invention is characterized in that the carcass cords have a twist factor T of 0.5 to 0.7 represented by the equation (1):

$$T = N \times \sqrt{\{(0.125 \times D/2)/\rho\}} \times 10^{-3} \qquad (1)$$

in which N is the number of final twists per 10 cm, D is a total nominal dtex of a cord, and $\rho$ is a specific gravity of a cord material.

The invention is characterized in that the twist factor T of the carcass cords is from 0.6 to 0.7.

The invention is characterized in that the topping rubber of the carcass ply has a complex modulus E* of 5 to 13 MPa.

The invention is characterized in that the pneumatic tire is a runflat tire provided in the sidewall portions with side-reinforcing rubber layers each having a cross section of such a crescent-shape that it has the maximum thickness at a center portion thereof and extends radially inward and outward from the center portion with decreasing its thickness.

The invention is characterized in that the outer surface of the tire has a curved profile composed of a plurality of circular arcs having radii of curvature which gradually decrease from a tire equator point CP at which the outer surface of the tire intersects with a tire equator plane C toward a ground contact edge side.

The invention is characterized in that the outer surface of the tire has a profile such that the radius of curvature of the outer surface of the tire gradually decreases from the tire equator point CP to a point P, in which the point P denotes a point on the tire outer surface which is apart from the tire equator plane C by a distance SP of 45% of the maximum section width SW of the tire, and the profile satisfies the following equations:

$$0.05 < Y60/SH \leq 0.1$$

$$0.1 < Y75/SH \leq 0.2$$

$$0.2 < Y90/SH \leq 0.4$$

$$0.4 < Y100/SH \leq 0.7$$

in which Y60, Y75, Y90 and Y100 denote radial distances between the tire equator point CP and each of points on the tire outer surface apart from the tire equator plane C by distances X60, X75, X90 and X100 of 60%, 75%, 90% and 100% of the half width (SW/2) of the tire maximum section width SW, respectively, and SH denotes a section height of the tire.

The invention is characterized in that the outer surface of the tire has a profile such that the radius of curvature measured on a ground contact edge side is larger than that measured at the tire equator point CP at which the outer surface of the tire intersects with the tire equator plane C.

The term "normal rim" as used herein means a rim defined for every tire in a standardizing system on which the tire is based and, for example, denotes "standard rim" in JATMA, "design rim" in TRA and "measuring rim" in ETRTO. Also, the term "normal inner pressure" as used herein means an air pressure defined for every tire in a standardizing system and, for example, denotes the maximum air pressure in JATMA, the maximum value recited in the table of "Tire Load Limits at Various Cold Inflation Pressures" in TRA, and the "Inflation Pressure" in ETRTO, provided that in case of tires for passenger cars, the "normal inner pressure" is 180 kPa.

Further, the term "complex modulus" (E*) as used herein denotes a value measured with a viscoelasticity spectrometer under the conditions of measuring temperature 70° C., initial tension 1,000 g, dynamic strain ±0.03%, and frequency 10 Hz.

Effects of the Invention

In the present invention, as mentioned above, an aramid fiber cord superior particularly in heat resistance is used as a carcass cord. Therefore, damages of the cord owing to temperature elevation during ranflat running can be suppressed. Further, since the aramid fiber cord has a high elasticity and accordingly can enhance the load-supporting ability, deformation of the tire in runflat running can be reduced while achieving decrease in the number of plies (weight reduction). Accordingly, in cooperation with the enhancement of heat resistance, the runflat durability can be enhanced. Further, the steering stability in runflat mode can be improved, thus achieving high running speed and long running distance in runflat mode.

Further, in case of the tires for passenger cars and the tires for motorcycles, the steering stability can be improved to achieve high running speed and high performances in normal running, with achieving weight reduction.

BRIEF DESCRIPTION OF THE DRAWINGS

graph showing a relationship between an axial distance from the tire equator plane of a point on a tread profile line (outer surface of tread) and a radial distance from the tire equator point of the point.

| Explanation of Symbols | |
|---|---|
| 2. | Tread portion |
| 3. | Sidewall portion |
| 4. | Bead portion |
| 5. | Bead core |
| 6. | Carcass |
| 6A | Carcass ply |
| 7. | Tread-reinforcing cord layer |
| 11. | Side-reinforcing rubber layer |
| 20. | Carcass cord |
| 21. | Bundle of filaments |

BEST MODE FOR CARRYING OUT THE INVENTION

Figure 1:
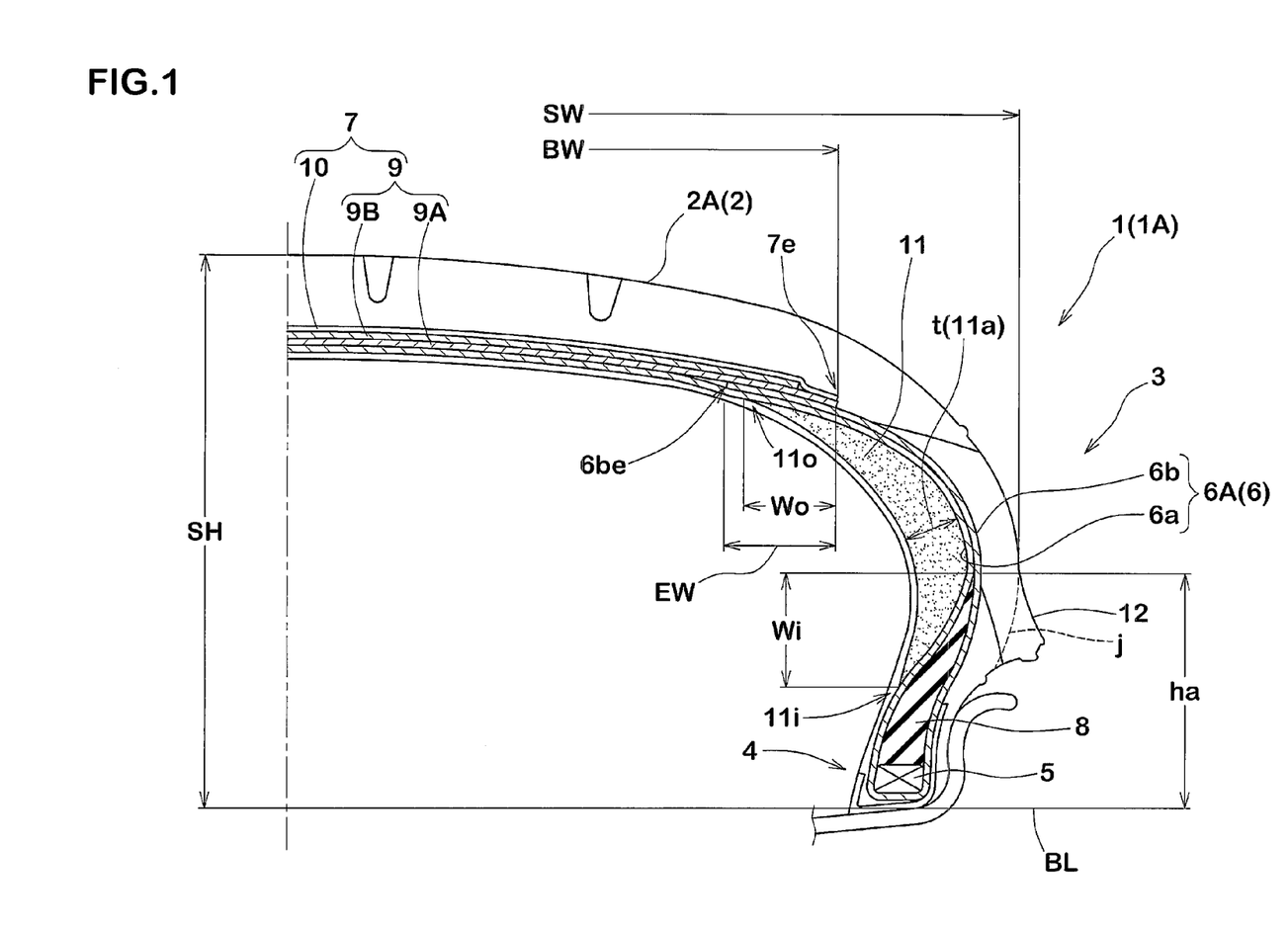
FIG. 1 is a meridian cross sectional view illustrating an embodiment of the present invention wherein the pneumatic tire is a runflat tire.

An embodiment of the present invention will now be explained with reference to the accompanying drawings. FIG. 1 is a meridian cross section view of a tire in the normal inner pressure condition wherein a tire 1 according to the present invention is a runflat tire 1A.

In FIG. 1, the runflat tire 1A in this embodiment includes a carcass 6 that extends from a tread portion 2 to bead cores 5 in bead portions 4 through sidewall portions 3, and a tread-reinforcing cord layer 7 that is disposed radially outward of the carcass 6 in the tread portion 2.

The carcass 6 comprises at least one carcass ply in which carcass cords are disposed at an angle of 45 to 90° with respect to the tire circumferential direction and covered with a topping rubber. In this embodiment is shown a carcass composed of a single carcass ply 6A of carcass cords arranged at an angle of 80 to 90°. The carcass ply 6A is composed of a ply body portion 6a that extends between the bead cores 5, 5, and ply turnup portions 6b that are continuous with the ply body portion 6a and are turned up around the bead cores 5 from the axially inside to the axially outside of the tire.

A bead apex rubber 8 for reinforcing the bead portion, which is for example made of a hard rubber having a rubber hardness of 65 to 98, is disposed between the ply body portion 6a and the ply turnup portion 6b to radially outwardly extend from the bead core 5 in a tapered manner. The "rubber hardness" as used herein denotes a hardness measured by a durometer type A at 23° C. Radial height "ha" of the bead apex rubber 8 from a bead base line BL is not particularly limited. However, if the height of the bead apex rubber 8 is too small, the runflat durability may be deteriorated, and if the height is too large, the tire weight may excessively increase or the ride comfort may be deteriorated. Therefore, it is preferred that the height "ha" of the bead apex rubber 8 is from 10 to 60%, especially 20 to 50%, of the section height SH of the tire.

In this embodiment, the carcass ply 6A has a so-called high turnup structure wherein the ply turnup portion 6b of the carcass 6 extends radially outwardly beyond the radially outer end of the bead apex rubber 8 and terminates so that outer end 6be of the turnup portion 6b is sandwiched between the ply body portion 6a and the tread-reinforcing cord layer 7. This structure can effectively reinforce the sidewall portion 3 by the use of single carcass ply 6A. Also, since the outer end 6be of the ply turnup portion 6b is located apart from the sidewall portion 3 that is greatly bent during runflat running, damages occurring from the outer end 6be can be suitably suppressed. The axial width EW of the overlapping part of the turnup portion 6b with the tread-reinforcing cord layer 7 is preferably at least 5 mm, more preferably at least 10 mm. It is also preferably at most 40 mm, more preferably at most 30 mm, from the viewpoint of weight reduction. In case of forming the carcass 6 using a plurality of carcass plies, it is preferable that at least one carcass ply has such a high turnup structure.

The tread-reinforcing cord layer 7 in this embodiment comprises a belt 9 superposed on the carcass 6, and a band 10 superposed outward of the belt 9. The belt 9 comprises at least two belt plies (in this embodiment, two belt plies 9A and 9B) in each of which belt cords are arranged at an angle, for example, of 10 to 45° with respect to the tire circumferential direction and covered with a topping rubber. The belt plies are stacked so that the belt cords in one ply crosses the cords in the other belt ply, whereby the rigidity of the belt is enhanced to strongly reinforce the tread portion 2 over approximately full width thereof by a hoop effect.

The band 10 comprises at least one band ply in which a band cord is spirally wound at an angle of 5° or less with respect to the tire circumferential direction and covered with a topping rubber. The band serves to bind the belt 9, thereby enhancing the steering stability, high speed durability and the like. As the band ply are adoptable a pair of right and left edge band plies which are disposed to cover only axially outer edge portions of the belt 9, a full band ply which covers approximately full width of the belt 9, and a combination of them. The band 10 shown in this embodiment comprises a single full band ply. The tread-reinforcing cord layer 7 may be formed of only belt 9 or only band 10.

In order to secure the runflat performances, side-reinforcing rubber layers 11 are disposed in the sidewall portions 3. The side-reinforcing rubber layer 11 has a cross section of such a crescent-shape that it has the maximum thickness at its center portion 11a and extends radially from the center portion 11a toward both a radially inner end 11i and a radially outer end 11o with gradually decreasing the thickness, respectively. The inner end 11i is located radially inward of the radially outer end of the bead apex rubber 8, and the outer end 11o is located axially inward of an outer end 7e of the tread-reinforcing cord layer 7. It is preferable that the radial width Wi of an overlapping part of the side-reinforcing rubber layer 11 with the bead apex rubber 8 is from 5 to 50 mm, and the axial width Wo of an overlapping part of the side-reinforcing rubber layer 11 with the tread-reinforcing cord layer 7 is from 0 to 50 mm, whereby occurrence of a difference in rigidity at the outer and inner ends 11o and 11i of the reinforcing rubber layer 11 is controlled.

In this embodiment, the side-reinforcing rubber layer 11 is disposed axially inward (on a tire cavity side) of the ply body portion 6a of the carcass 6 and, therefore, when the sidewall portion 3 is subject to a flexural deformation, mainly a compressive load acts on the side-reinforcing rubber layer 11 and a tensile load acts on the carcass ply 6A which includes a cord material. Since a rubber material is resistant to the compressive load and a cord material is resistant to the tensile load, the configuration as mentioned above of the side-reinforcing rubber layer 11 can efficiently enhance the flexural rigidity of the sidewall portion 3, thus effectively decreasing a vertical flex of a tire in runflat mode. It is preferable that the side-reinforcing rubber layer 11 has a rubber hardness of at least 60, especially at least 65. If the hardness is less than 60, the compressive strain in runflat mode is large, so sufficient runflat performances are not obtained. If the hardness is too high, the longitudinal spring constant of a tire excessively increases to lower the ride comfort. From such points of view, it is preferable that the hardness of the side-reinforcing rubber layer 11 is at most 90, especially at most 80. The maximum thickness "t" of the side-reinforcing rubber layer 11 is suitably selected depending on tire size, kind of the tire and the like. In case of tires for passenger cars, the maximum thickness "t" is usually from 5 to 20 mm.

Figure 2:
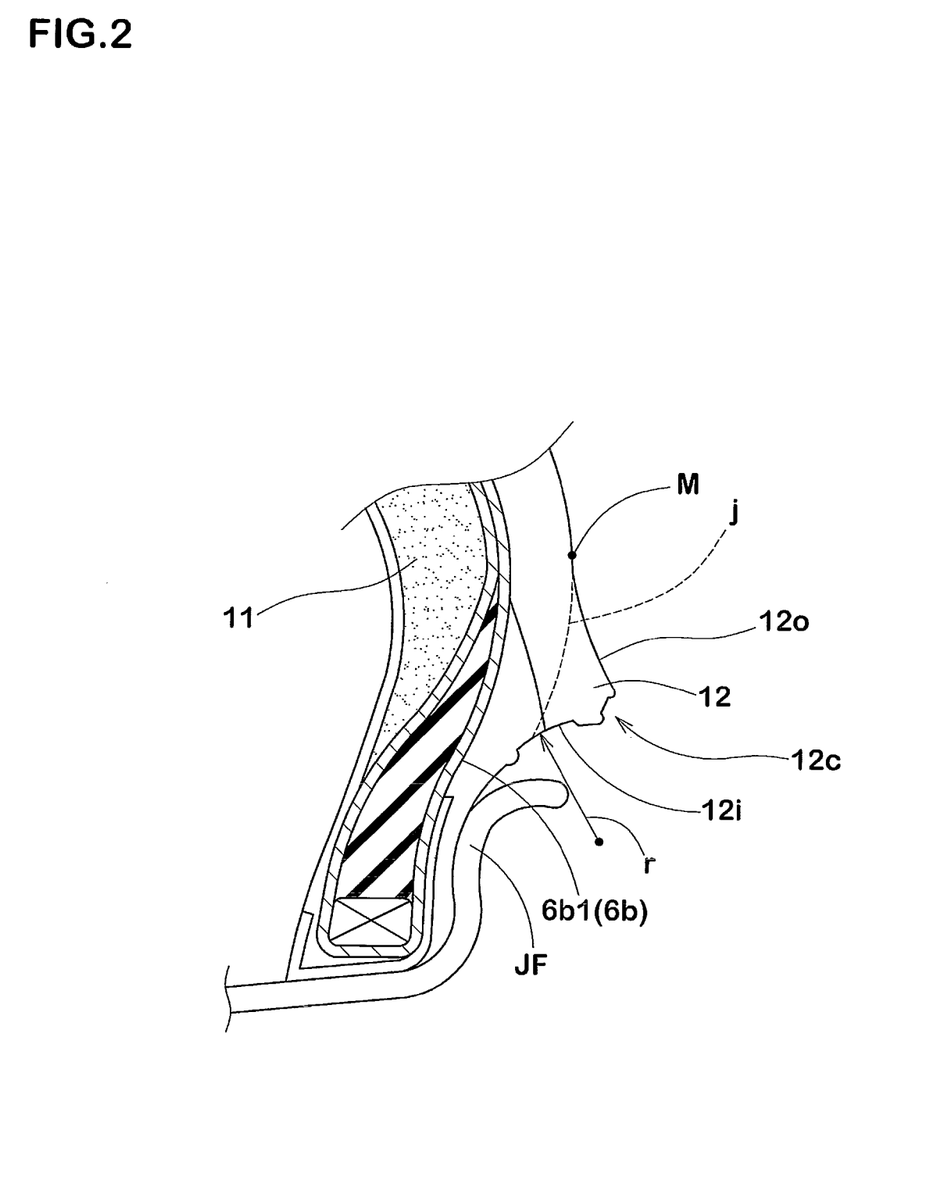
FIG. 2 is a cross sectional view illustrating a bead portion in an enlarged form of the tire shown in FIG. 1.
Figure 3:
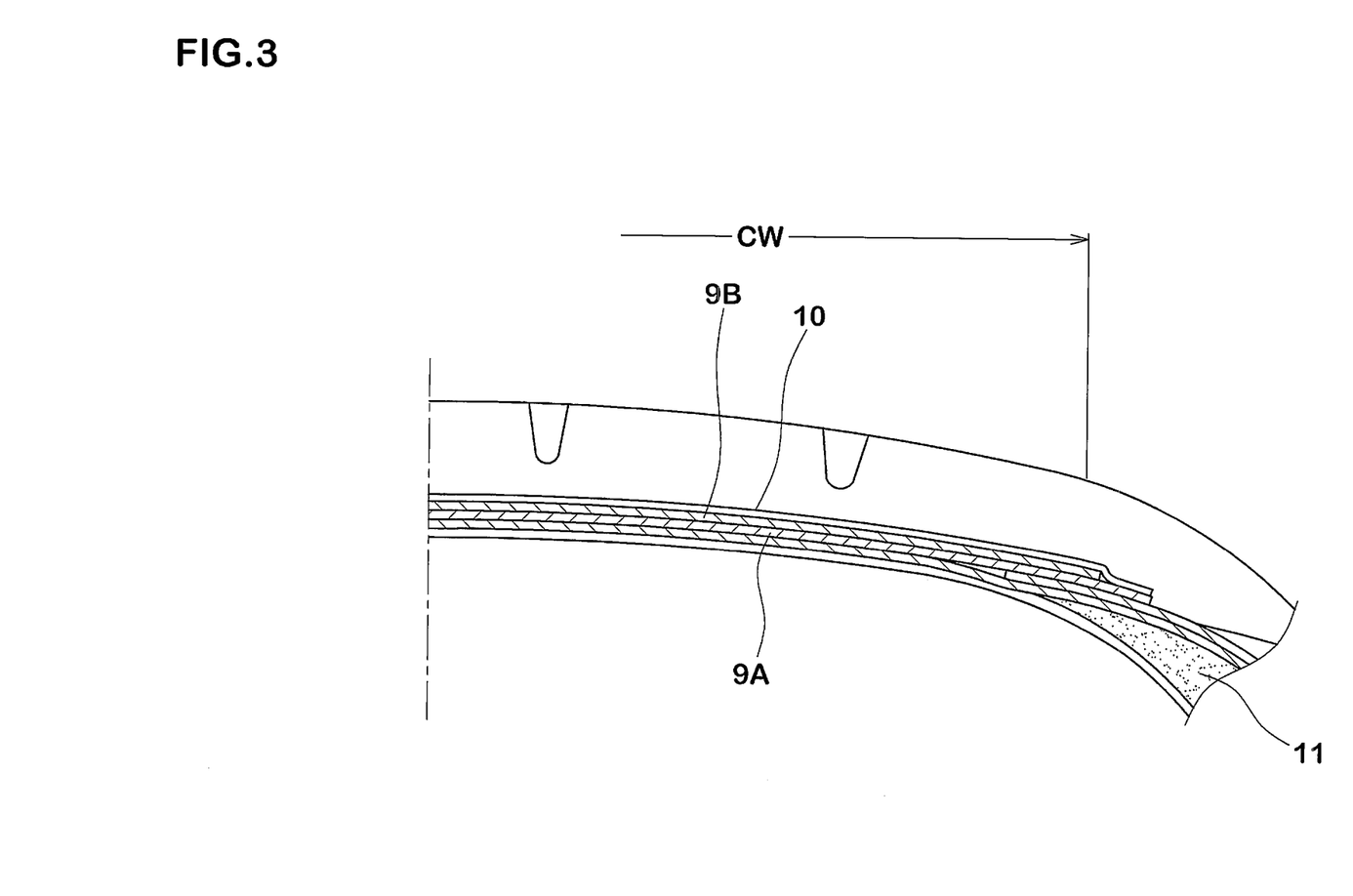
FIG. 3 is a cross sectional view illustrating a tread portion in an enlarged form of the tire shown in FIG. 1.

In this embodiment, a rim-protecting rib 12 is convexly disposed in the bead portion 4. The rim-protecting rib 12 is, as shown in FIG. 2, a rib projecting from a base profile line "j" to cover a rim flange JF. It has a trapezoidal cross section which is enclosed by a projecting face 12c which projects most axially outwardly, a radially inner slope 12i which smoothly continues from the projecting face 12c to the axially outer surface of the bead portion, and a radially outer slope 12o which smoothly continues from the projecting face 12c to the base profile line "j" in the vicinity of a tire maximum width point M. The radially inner slope 12i is a concave arc-like face having a larger radius "r" of curvature than an arc-like portion of the rim flange JF, and serves to protect the rim flange JF from stones in normal running condition. It is also serves to decrease the amount of deformation of the bead portion in runflat running condition, thus improving the steering stability in runflat running and the runflat durability, since the radially inner slope 12i will contact the rim flange JF with leaning against the arc-like portion of the rim flange JF.

In the present invention, an aramid fiber is used in the carcass cords in order to improve the runflat steering stability and the runflat durability.

The aramid fiber is known as a high elastic fiber, and can enhance the load-supporting ability of runflat tire 1A by using it in carcass cords of the runflat tire 1A. Therefore, it is possible to reduce deformation of the tire in runflat mode while achieving weight reduction based on, for example, decrease in number of carcass plies, diameter of carcass cords, and/or cord arrangement density (number of cord ends). Furthermore, decrease in elastic modulus of the aramid fiber is small even at a high temperature of 100 to 150° C. as compared with other organic fiber cord materials and, therefore, the aramid fiber has an excellent heat resistance. Therefore, even if the tire temperature elevates during runflat running, it is possible to prevent occurrence of damage owing to lowering of strength of the carcass cords, increase in tire deformation amount owing to lowering of elastic modulus, and accompanying further elevation of tire temperature. Thus, the runflat durability can be improved. Further, it is possible to improve the steering stability in runflat mode, since the high elastic modulus can be maintained to enhance the tire rigidity even if the tire temperature elevates. Thus, high running speed and long running distance in runflat mode can be achieved.

Figure 4:
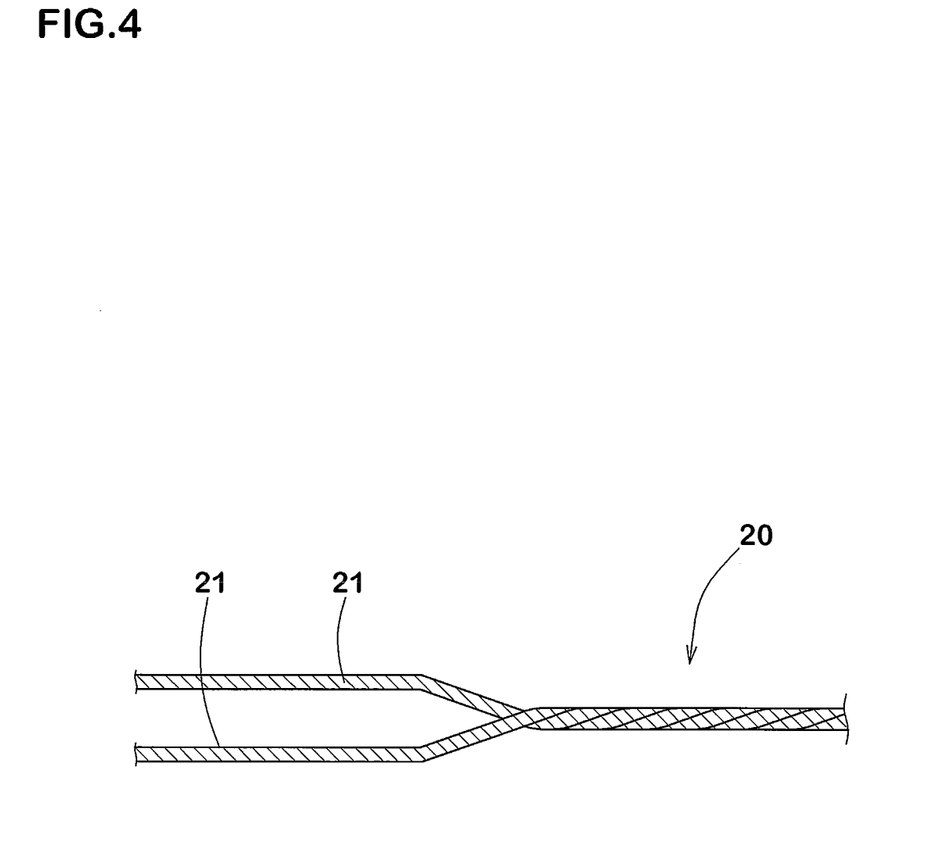
FIG. 4 is side view illustrating a carcass cord.

However, the aramid fiber tends to be inferior in fatigue resistance owing to high elasticity. Therefore, in this embodiment, to the carcass cords 20 is applied a two bundle twist structure wherein, as shown in FIG. 4, two bundles 21 (strands 21) of first-twisted filaments of aramid fiber are twisted together. Furthermore, the twisting of two bundles (final twist) is carried out at a higher twist factor T than that conventionally employed.

The "twist factor T" is represented, as well known, by the following equation (1):

$$T = N \times \sqrt{\{(0.125 \times D/2)/\rho\}} \times 10^{-3} \tag{1}$$

in which N is the number of final twists of cord per 10 cm, D is a total nominal dtex of single cord (fineness), and ρ is a specific gravity of a cord material.

A twist factor T as high as 0.5 to 0.7 is adopted, whereby the fatigue resistance that is a drawback of the aramid fiber can be improved and, therefore, the runflat durability can be greatly improved as compared with conventional rayon cords. If the twist factor T of the carcass cord 20 is less than 0.5, the effect of improving the fatigue resistance is small, so the runflat durability cannot be sufficiently improved. If the twist factor T is more than 0.7, the twist processing becomes difficult, so it is industrially disadvantageous. It is preferable that the twist factor T is 0.6 or more, since the fatigue resistance of cords can be further improved to improve the runflat durability.

A two bundle twist structure is applied to the carcass cords 20 in order to exhibit an excellent reinforcing effect by utilizing a high elasticity which is an important property of the aramid fiber. In this case, there is preferred a so-called balanced twisting that the number of first twists is the same as the number of the final twists. However, the number of first twists and the number of final twists may be different so long as the ratio of the number of first twists to the number of final twists (number of first twists/number of final twists) falls within the range of 0.2 to 2.0, preferably 0.5 to 1.5.

The above-mentioned total dtex D (fineness) of a single cord is not particularly limited, but is preferably from 1,500 to 5,000 dtex for runflat tires. Further, it is preferable that a product of the number of cord ends "n" (cords/5 cm) and the total dtex D is from 70,000 to 150,000. If the product is less than 70,000, the runflat durability and the steering stability come short, though aramid fiber is used, and if it is more than 150,000, the rigidity of carcass becomes too large, so the ride comfort is impaired and the weight and cost unnecessarily increase. From such points of view, the product D×n is more preferably at least 100,000 and is at most 120,000.

Damages of the carcass cords 20 arising from fatigue resistance are easy to occur at portions which receive a compressive strain when a tire is deformed, that is to say, at a bead side portion 6b1 of the ply turnup portion 6b as shown in FIG. 2. However, in this embodiment, the rim-protecting rib 12 is convexly disposed in the bead portion 4 and, therefore, bead deformation in runflat running is decreased and the compressive strain is hard to act on the carcass cords 20. As a result, fatigue damage of the carcass cords made of aramid fiber can be further suppressed, whereby the runflat durability can be further improved. In other words, in tires using carcass cords made of aramid fiber, it is preferable to use the rim-protecting rib 12 from the viewpoint of suppressing the fatigue damage of the cords.

Further, in this embodiment, as a topping rubber of the carcass ply 6A is used a rubber having a high elasticity as compared with a conventional carcass topping rubber, i.e., a rubber having a complex modulus E* of 5 to 13 MPa. The complex modulus E* of a conventional topping rubber for carcass is about 3.8 MPa. By using such a high elastic rubber as a topping rubber, a strain generating at the carcass cords 20 when a tire is deformed can be decreased, thus further improvement of the runflat durability can be achieved. If the complex modulus E* of the carcass topping rubber is less than 5 MPa, the above effect is not expected, and if the complex modulus E* is more than 13 MPa, the rubber becomes too hard, so the ride comfort is remarkably deteriorated. Therefore, it is preferable that the complex modulus E* is 5.5 MPa or more, especially 6 MPa or more, and it is 11 MPa or less, especially 9 MPa or less.

In the meridian cross section of the tire in the above-mentioned normal inner pressure condition, the profile of outer surface 2A of the tire is formed of a plurality of circular arcs having different radii of curvature. In particular, in case of the runflat tire 1A, it is preferable that the profile is formed of a plurality of such circular arcs that the radius R of curvature gradually decreases from a tire equator point CP which is a point of intersection of the tire outer surface 2A with the tire equator plane C, toward a ground contact edge Te side, whereby the rubber volume of the side-reinforcing rubber layer 11 can be minimized to enhance weight reduction and ride comfort. In particular, these effects can be more highly exhibited when a special profile as proposed in Japanese Patent No. 2994989 is adopted.

Figure 5:
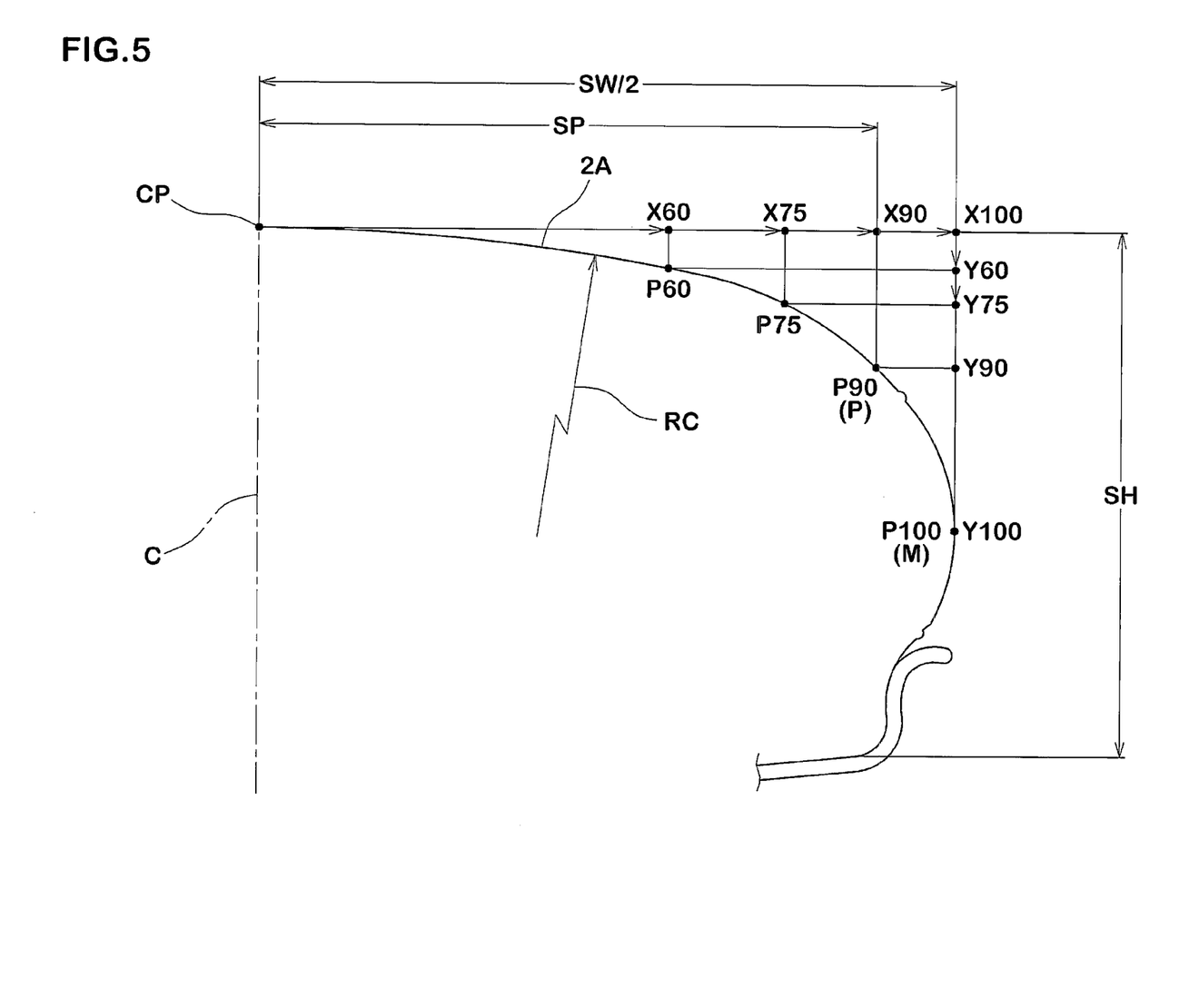
FIG. 5 is a diagram showing a profile of the outer surface of a tire.

To explain in more detail, as shown in FIG. 5, if "P" is defined as a point on the tire outer surface 2A which is apart from the tire equator plane C by a distance SP of 45% of a maximum section width SW of the tire, the radius RC of curvature of the tire outer surface 2A is set to gradually decrease from the tire equator point CP to the point P. The above-mentioned "maximum section width SW" of the tire denotes the maximum width on a base profile line "j" of the tire outer surface 2A, and the base profile line "j" denotes a smooth profile line of the outer surface 2A of a tire from which local concave and convex parts such as fine ribs and grooves showing letters, figures and marks for decoration or information, a rim-protecting rib 12 for preventing a rim from coming off and a side-protecting rib for protecting from a cut.

Further, if P60, P75, P90 and P100 denote points on the tire outer surface 2A apart from the tire equator plane C by distances X60, X75, X90 and X100 of 60%, 75%, 90% and 100% of the half width (SW/2) of the tire maximum section width SW, respectively, and if Y60, Y75, Y90 and Y100 denote radial distances between the tire equator point CP and each of the points P60, P75, P90 and P100 on the tire outer surface 2A, and if SH denotes a section height of the tire in the normal inner pressure condition which is a radial height from a bead base line BL to the tire equator point CP, the radial distances Y60, Y75, Y90 and Y100 satisfy the following equations.

$$0.05 < Y60/SH \leq 0.1$$

$$0.1 < Y75/SH \leq 0.2$$

$$0.2 < Y90/SH \leq 0.4$$

$$0.4 < Y100/SH \leq 50.7$$

Figure 6:
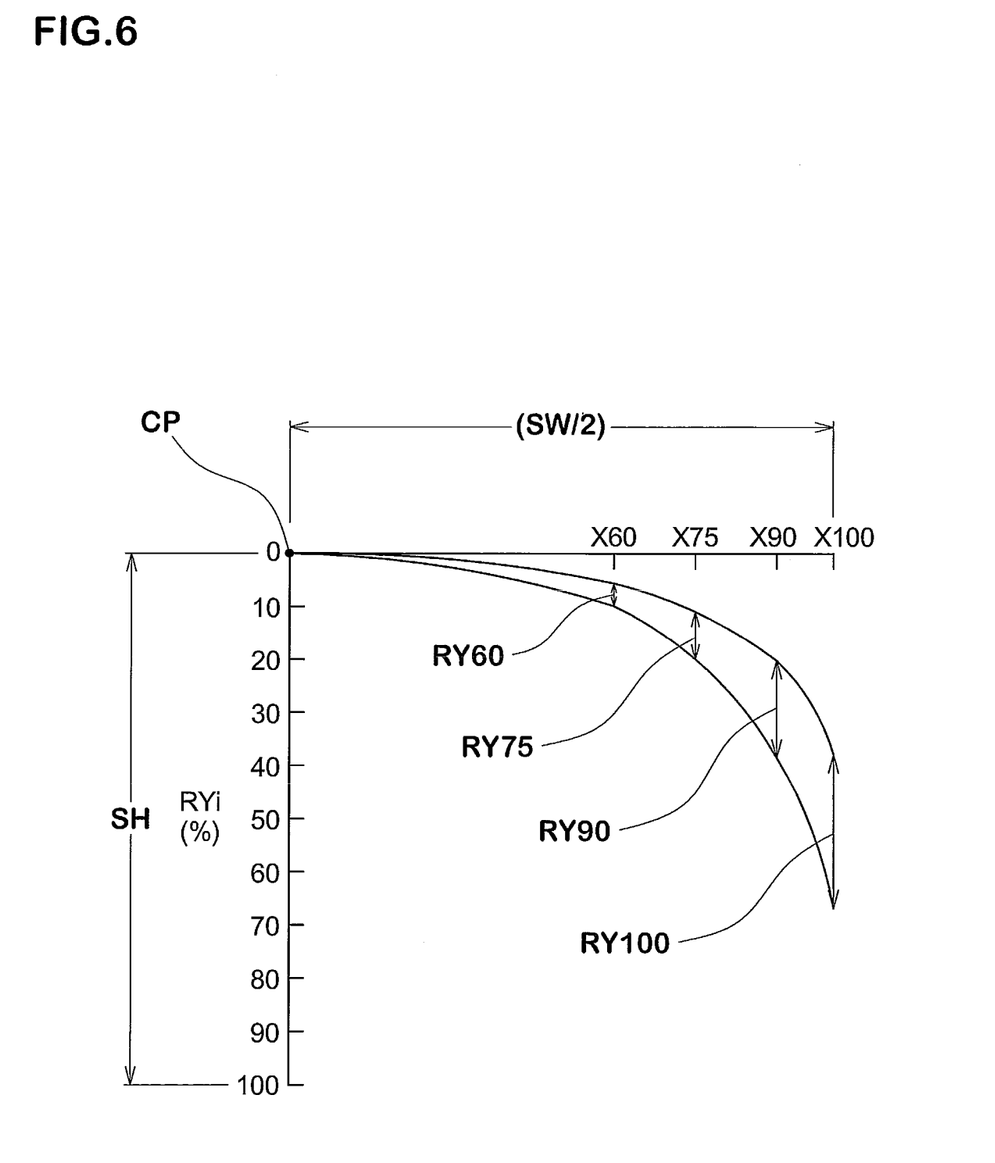
FIG. 6 is a diagram showing a range of RYi at each location on the outer surface of the tire.

Ranges RYi satisfying the above equations are shown in FIG. 6 wherein RY60=Y60/SH, RY75=Y75/SH, RY90=Y90/SH and RY100=Y100/SH. It is reported in Japanese Patent No. 2994989 that since a tread having a profile satisfying the above equations is very round as shown in FIGS. 5 and 6, the footprint of the tire is in a longitudinally long elliptic shape that the ground contact width is small and the ground contact length is large, and the noise performance and aquaplaning performance can be improved. If the values of RY60, RY75, RY90 and RY100 are less than the above ranges, the tread portion 2 becomes flat and the profile of the tire outer surface 2A approaches a profile of a conventional tire. If they are more than the above ranges, the tread portion 2 has a markedly convex profile and the ground contact width becomes too small, so necessary running performances in normal running operation cannot be secured.

Since the aspect ratio of tire, the maximum section width of tire, the maximum height of tire and the like can be approximately determined from tire standards such as JATMA and ETRTO if the tire is size is previously determined, the ranges of RY60, RY75, RY90 and RY100 can be readily calculated. Therefore, the tire outer surface 2A can be suitably determined by depicting it in a smooth curve from the tire equator point CP to the points P mentioned above so as to satisfy the ranges of RY60, RY75, RY90 and RY100 at respective positions and so as to gradually decrease the radius RC of curvature.

It is preferable that the above-mentioned tire has a ground contact width CW, which is an axial distance between axially outermost edges of a footprint formed when a tire contacts a ground, within the range of 50 to 65% of the tire maximum section width SW under condition that a load of 80% of a normal load is applied to the tire under a normal inner pressure condition. The reason is that if the ground contact width CW is less than 50% of the maximum section width SW, the wandering performance is deteriorated under normal running condition and uneven wear is easy to occur due to uneven ground contact pressure. If the ground contact width CW is more than 65% of the maximum section width SW, the ground contact width is excessively large and it is difficult to simultaneously achieve both of good passing noise performance and good aquaplaning performance.

Since such a special profile has the feature that the region of the sidewall portion is short, the volume of a rubber required for the side-reinforcing rubber layer 11 can be decreased by adopting it to runflat tires and, therefore, weight reduction and improvement in ride comfort of runflat tires can be achieved. On the other hand, the amount of deformation in tread portion 2 having a large rubber volume becomes larger as compared with tires having a usual tread profile. Therefore, the carcass cords of aramid fiber having an enhanced heat resistance are also advantageous for tires having this special profile.

Figure 7:
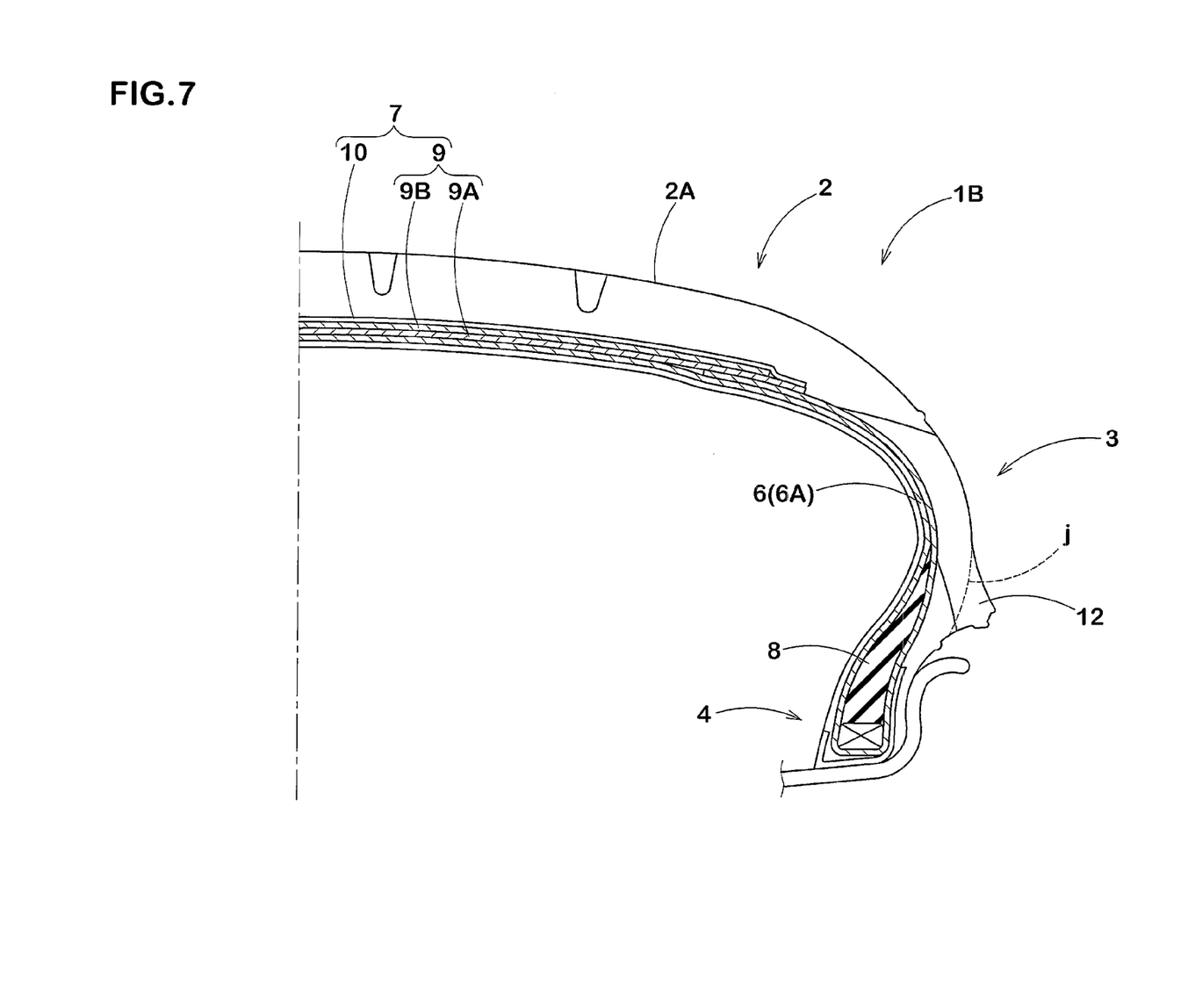
FIG. 7 is a meridian cross sectional view illustrating an embodiment of the present invention wherein the pneumatic tire is a passenger car tire.

The pneumatic tire 1 of the present invention can be formed into normal tire 1B for passenger cars, as shown in FIG. 7. In this case, the passenger car tire 1B can have approximately the same structure as the above-mentioned runflat tire 1A except that the side-reinforcing rubber layer 11 is not disposed. In the passenger car tire 1B, the rigidity of carcass is enhanced by the use of the carcass cords 20 of aramid fiber, so the steering stability in normal running can be enhanced to achieve high speed running and high performances with achievement of weight reduction. In the case that the above-mentioned high elastic rubber having a complex modulus of 5 to 13 MPa is used as a topping rubber for the carcass ply 6A, a strain occurring in the carcass cords 20 can be reduced as well as further enhancing the steering stability in normal running, so a fatigue damage of the aramid fiber cords can be suppressed to enhance the durability. It is preferable that the total nominal dtex D of the carcass cords 20 in the passenger car tire 1B is from 1,000 to 5,000 dtex, and the product of the total nominal dtex D and the number of cord ends "n" (per 5 cm) is from 80,000 to 120,000.

Figure 8:
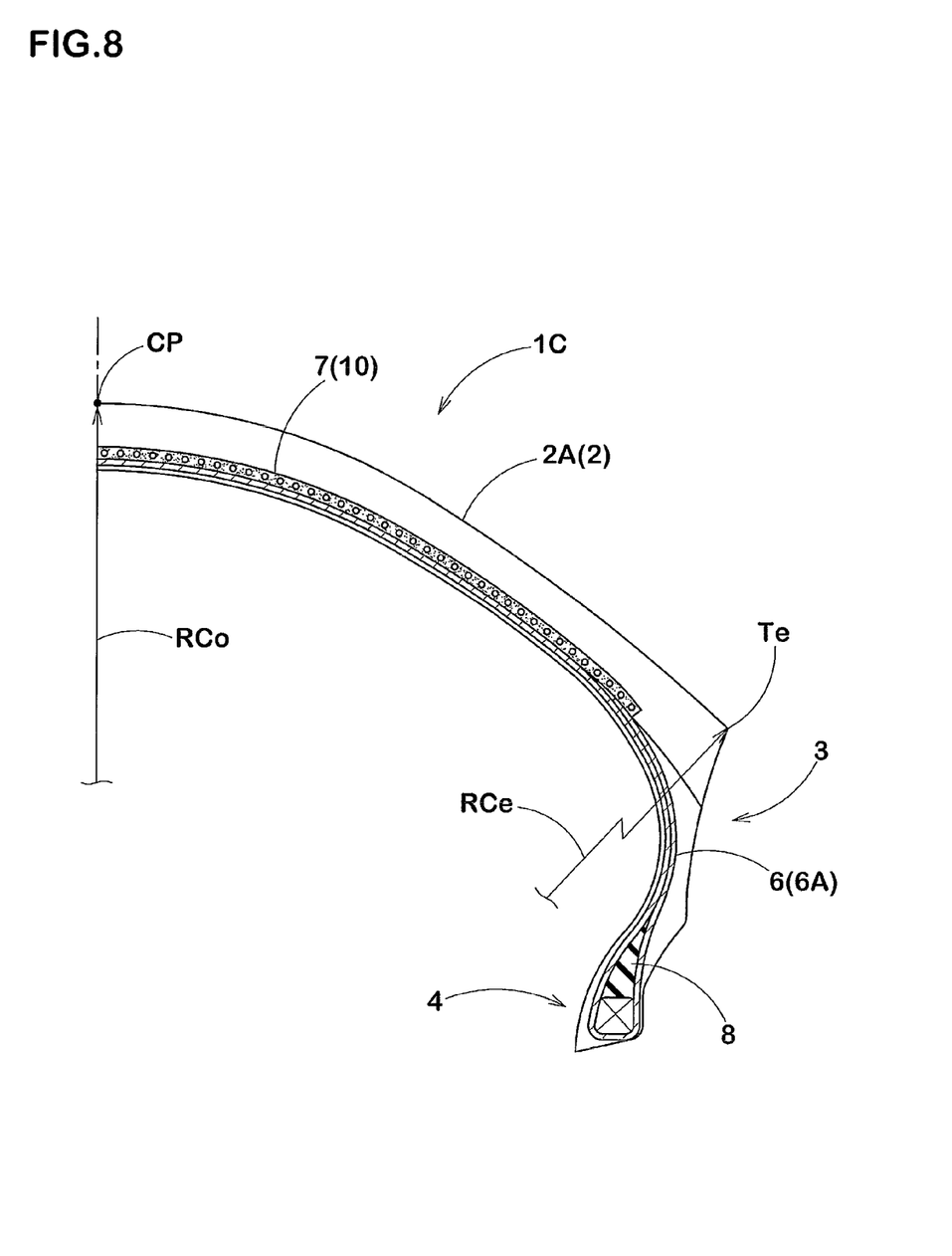
FIG. 8 is a meridian cross sectional view illustrating an embodiment of the present invention wherein the pneumatic tire is a motorcycle tire.

Further, the pneumatic tire 1 of the present invention can be formed into normal tire 1C for motorcycles, as shown in FIG. 8. In the motorcycle tire 1C, too, the rigidity of carcass is enhanced by the use of the carcass cords 20 of aramid fiber, so the steering stability in normal running can be enhanced to achieve high speed running and high performances with achievement of weight reduction. Further, in the case that the above-mentioned high elastic rubber having a complex modulus of 5 to 13 MPa is used as a topping rubber for the carcass ply 6A, a strain occurring in the carcass cords 20 can be reduced as well as further enhancing the steering stability in normal running, so a fatigue damage of the aramid fiber cords can be suppressed to enhance the durability. It is preferable that the total nominal dtex D of the carcass cords 20 in the motorcycle tire 1C is from 1,000 to 2,500 dtex, and the product of the total nominal dtex D and the number of cord ends "n" (per 5 cm) is from 80,000 to 120,000.

The profile of the outer surface 2A of the motorcycle tire 1C is such that the radius RCe of curvature on a ground contact edge Te side is larger than the radius RCo of curvature at the tire equator point CP, whereby the stability in cornering is secured with exhibiting the cornering performance peculiar to motorcycles when banking a motorcycle body.

While particularly preferable embodiments of the present invention have been described, the present invention can be practiced with various changes and modifications without being limited to the embodiments shown in the drawings.

EXAMPLES

Runflat tires of size 245/40R18 having the structure shown in FIG. 1 were manufactured based on the specifications shown in Table 1, and tested with respect to the runflat durability. The results are shown in Table 1. Specifications other than the carcass cords shown in Table 1 are common to all tires.

Carcass: single ply, cord angle 90°
Belt layer: two plies, cord angles +24°/−24°
Side-reinforcing rubber layer: hardness 90,
  maximum thickness 10.0 mm
In Table 1, the twist factor T is represented by the following equation (1):

$$T = N \times \sqrt{\{(0.125 \times D/2)/\rho\}} \times 10^{-3} \quad (1)$$

Further, the specific gravity $\rho$ of the rayon fiber cord is 1.51, and the specific gravity $\rho$ of the aramid fiber cord is 1.44.

All tires have substantially the same tread profile within the ranges of RY60=0.05 to 0.1, RY75=0.1 to 0.2, RY90=0.2 to 0.4 and RY100=0.4 to 0.7.

<Runflat Durability>

A tire was mounted on a rim (18×8.5 J) from which a valve core was removed, and it was run on a drum tester in the deflated state at a speed of 80 km/hour under a vertical load of 4.14 kN. The running distance up to breaking of the tire was measured. The results are shown as an index based on the result of Comparative Example 1 regarded as 100. The larger the value, the better the durability.

TABLE 1

|  | Com. Ex. 1 | Ex. 1 | Ex. 2 | Ex. 3 | Ex. 4 | Com. Ex. 2 | Ex. 5 | Ex. 6 | Ex. 7 |
|---|---|---|---|---|---|---|---|---|---|
| Cord material | rayon | aramid | aramid | aramid | aramid | rayon | aramid | aramid | aramid |
| Cord constitution | 1840 dtex/2 | 1100 dtex/2 | 1670 dtex/2 | 1100 dtex/2 | 1670 dtex/2 | 1840 dtex/2 | 1100 dtex/2 | 1670 dtex/2 | 1100 dtex/2 |
| Total nominal dtex D (dtex) | 3680 | 2200 | 3340 | 2200 | 3340 | 3680 | 2200 | 3340 | 2200 |
| Number of final twists per 10 cm | 48 | 44 | 35 | 53 | 43 | 48 | 44 | 35 | 53 |
| Number of first twists per 10 cm | 48 | 44 | 35 | 53 | 43 | 48 | 44 | 35 | 53 |
| Twist factor T | 0.5924 | 0.4300 | 0.4214 | 0.5179 | 0.5177 | 0.5924 | 0.4300 | 0.4214 | 0.5179 |
| Number of cord ends per 5 cm | 51 | 53 | 35 | 53 | 35 | 51 | 53 | 35 | 53 |
| Carcass topping rubber |  |  |  |  |  |  |  |  |  |
| Complex modulus E* (MPa) | 3.8 | 3.8 | 3.8 | 3.8 | 3.8 | 5.7 | 5.7 | 5.7 | 5.7 |
| Runflat durability | 100 | 112 | 113 | 137 | 135 | 109 | 122 | 126 | 150 |

|  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Cord material | aramid | aramid | aramid | aramid | aramid | aramid | aramid | aramid | aramid |
| Cord constitution | 1670 dtex/2 | 1100 dtex/2 | 1670 dtex/2 | 1100 dtex/2 | 1670 dtex/2 | 1100 dtex/2 | 1670 dtex/2 | 1100 dtex/2 | 1670 dtex/2 |
| Total nominal dtex D (dtex) | 3340 | 2200 | 3340 | 2200 | 3340 | 2200 | 3340 | 2200 | 3340 |
| Number of final twists per 10 cm | 43 | 68 | 55 | 68 | 55 | 68 | 55 | 68 | 55 |
| Number of first twists per 10 cm | 43 | 68 | 55 | 68 | 55 | 68 | 55 | 68 | 55 |

TABLE 1-continued

| | | | | | | | | | |
|---|---|---|---|---|---|---|---|---|---|
| Twist factor T | 0.5177 | 0.6645 | 0.6622 | 0.6645 | 0.6622 | 0.6645 | 0.6622 | 0.6645 | 0.6622 |
| Number of cord ends per 5 cm | 35 | 53 | 35 | 53 | 35 | 53 | 35 | 53 | 35 |
| Carcass topping rubber | | | | | | | | | |
| Complex modulus E* (MPa) | 5.7 | 5.7 | 5.7 | 8.0 | 8.0 | 10.3 | 10.3 | 14 | 14 |
| Runflat durability | 148 | 166 | 169 | 185 | 183 | 191 | 190 | 193 | 185 |

As understood from comparison of Examples 1 and 2 with Examples 3 and 4, the fatigue resistance which is drawback of the aramid fiber cords can be improved by increasing the twist factor T to 0.5 or more and, therefore, an excellent heat resistance and an excellent load-supporting ability which are advantages of the aramid fiber cords can be effectively exhibited to improve the runflat durability. From Examples 5, 7 and 9 or from Examples 6, 8 and 10, it is also understood that as the twist factor T increases, the fatigue resistance is increased to improve the runflat durability. Further, from Examples 3 and 7 or from Examples 4 and 8, it is understood that in case that the twist factor T is the same, the runflat durability is improved by increasing the complex modulus of the topping rubber to 5 MPa or more.

What is claimed is:

1. A pneumatic runflat tire including a carcass extending from a tread portion to bead cores in bead portions through sidewall portions, and a tread-reinforcing cord layer disposed radially outward of the carcass and in the tread portion, wherein in the meridian cross section including the rotational axis of the tire in a normal inner pressure condition that the tire is mounted on a normal rim and inflated to a normal inner pressure,
   the outer surface of the tire has a curved profile composed of a plurality of circular arcs having different radii of curvature,
   the carcass comprises a carcass ply in which carcass cords are arranged at an angle of 45 to 90° with respect to a circumferential direction of the tire and are covered with a topping rubber, and
   an aramid fiber is used for the carcass cords, and
   the carcass cords have a two-bundle twisted structure that two bundles of first-twisted filaments are subjected to final twist,
   a total nominal dtex (fineness) D of the carcass cord is not less than 2200 dtex, and
   the carcass cords have a twist factor T of 0.6622 to 0.7 represented by the equation (1):

$$T = N \times \sqrt{\{(0.125 \times D/2)/\rho\}} \times 10^{-3} \quad (1)$$

in which N is the number of final twists per 10 cm, D is the total nominal dtex (fineness) of a cord, and $\rho$ is a specific gravity of a cord material.

2. The pneumatic runflat tire of claim 1, wherein the topping rubber of the carcass ply has a complex modulus E* of 5 to 13 MPa.

3. The pneumatic runflat tire of claim 1, wherein the tire is provided in the sidewall portions with side-reinforcing rubber layers each having a cross section of such a crescent-shape that it has the maximum thickness at a center portion thereof and extends radially inward and outward from the center portion with decreasing its thickness.

4. The pneumatic runflat tire of claim 1, wherein the outer surface of the tire has a curved profile composed of a plurality of circular arcs having radii of curvature which gradually decrease from a tire equator point CP which is a point of intersection of the outer surface of the tire with a tire equator plane C, toward a ground contact edge side.

5. The pneumatic runflat tire of claim 4, wherein the outer surface of the tire has a profile such that the radius RC of curvature of the outer surface of the tire gradually decreases from the tire equator point CP to a point P, in which the point P denotes a point on the outer surface which is apart from the tire equator plane C by a distance SP of 45% of a maximum section width SW of the tire, and the profile satisfies the following equations:

$$0.05 < Y60/SH \leq 0.1$$

$$0.1 < Y75/SH \leq 0.2$$

$$0.2 < Y90/SH \leq 0.4$$

$$0.4 < Y100/SH \leq 0.7$$

in which Y60, Y75, Y90 and Y100 denote radial distances between the tire equator point CP and each of points on the tire outer surface apart from the tire equator plane C by distances X60, X75, X90 and X100 of 60%, 75%, 90% and 100% of the half width (SW/2) of the tire maximum section width SW, respectively, and SH denotes a section height of the tire.

6. The pneumatic runflat tire of claim 1, wherein the outer surface of the tire has a profile such that the radius of curvature measured on a ground contact edge side is larger than that measured at the tire equator point CP.

7. The pneumatic runflat tire of claim 2, wherein the tire is provided in the sidewall portions with side-reinforcing rubber layers each having a cross section of such a crescent-shape that it has the maximum thickness at a center portion thereof and extends radially inward and outward from the center portion with decreasing its thickness.

* * * * *